United States Patent Office 2,919,106
Patented Dec. 29, 1959

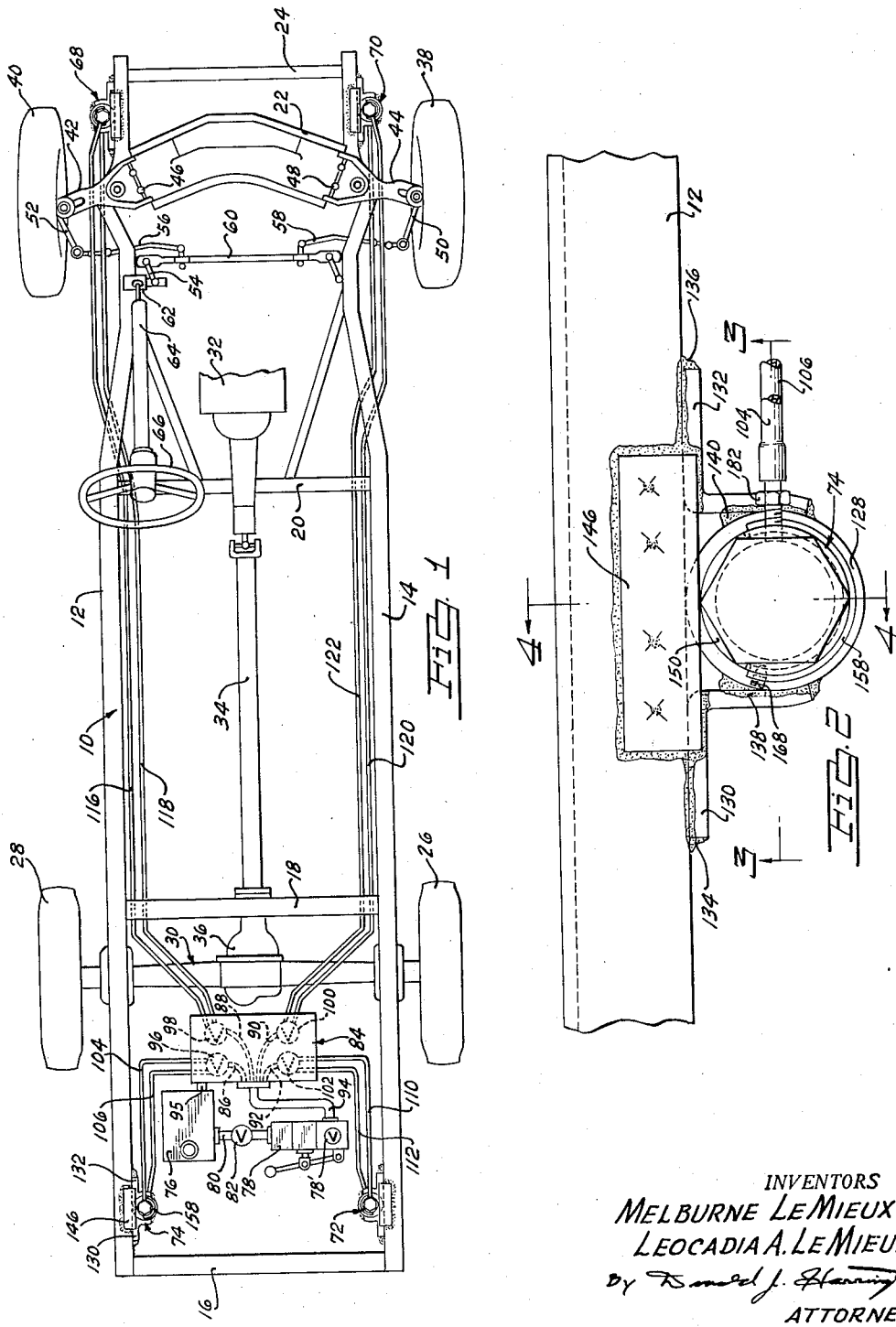
Dec. 29, 1959     M. E. LE MIEUX ET AL     2,919,106
MEANS FOR MOUNTING A HYDRAULIC AUTOMOTIVE JACK
Filed July 11, 1955     2 Sheets-Sheet 1
INVENTORS
MELBURNE LE MIEUX &
LEOCADIA A. LE MIEUX
ATTORNEY

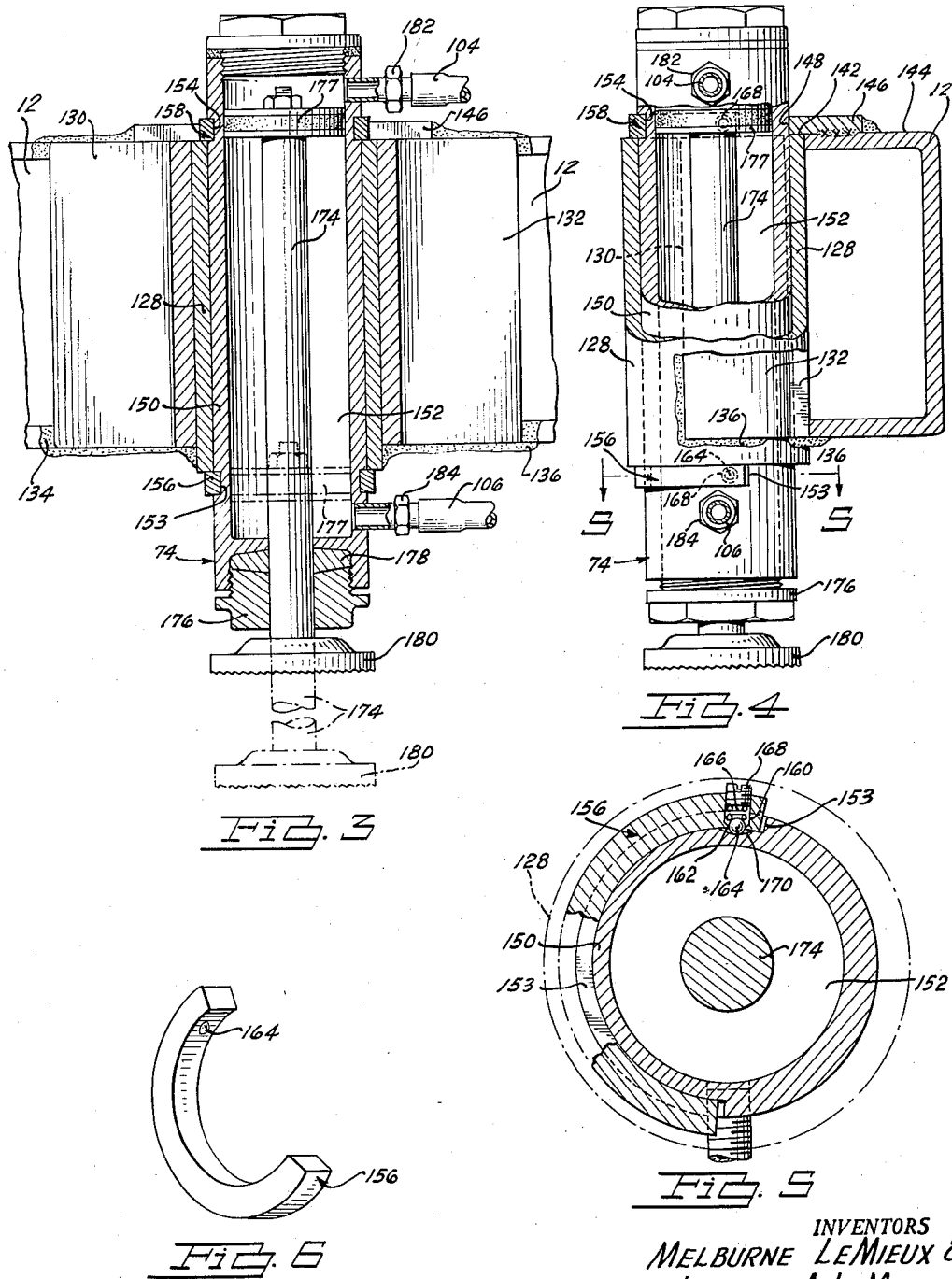

2,919,106

MEANS FOR MOUNTING A HYDRAULIC AUTOMOTIVE JACK

Melburne E. Le Mieux and Leocadia A. Le Mieux, Alpena, Mich.

Application July 11, 1955, Serial No. 520,953

5 Claims. (Cl. 254—86)

Our present invention relates generally to a new and improved automobile jack system for an automotive vehicle, and more particularly to a jack system having a plurality of jacks adapted to be mounted on and carried by structural components of the vehicle at strategic locations.

According to a principal feature of our invention, we have provided an automotive jack system wherein the individual jacks thereof may be readily and conveniently secured to the frame side rail or other frame member to provide a durable and reliable attachment. By preference, one jack is mounted adjacent each of the vehicle wheels.

The provision of a jack system of the type above described being a principal object of our invention, it is a further object of our invention to provide an automotive jack system which is characterized by its simplified construction and by its relatively low manufacturing cost.

It is a further object of our invention to provide a jack system for automobiles or the like which includes individual jacks adapted to be secured to an automobile frame or removed therefrom with a minimum of difficulty without the use of special tools.

It is a further object of our invention to provide a jack system which may be readily installed in automobiles of conventional design with a minimum of difficulty and wherein the manually operable portions of the system may be conveniently mounted in the vehicle trunk or some other convenient location within the vehicle.

It is another object of our invention to provide an improved and reliable means for securing the individual jacks of the system above mentioned to the vehicle frame to provide for interchangeability and for adequate road clearance.

We contemplate that the jack system of our instant invention may be used with automobiles of contemporary design in which the clearance between the axle and the road are close. Any one of four individual jacks may be mounted in proximate relationship with respect to each wheel and each of the several jacks may be selectively energized to raise its associated wheel from the ground for servicing. Alternatively, all of the jacks may be operated simultaneously if the vehicle becomes mired or otherwise prevented from obtaining driving traction.

We are aware of various automobile jack systems employing jacks permanently mounted to the vehicle frame. However, these systems are complex in design and costly to manufacture. Further, these jack systems of known construction do not include effective means for securing the jacks to the frame to provide a simplified and reliable attachment while at the same time facilitating convenient assembly and disassembly.

For the purpose of more particularly describing the novel features of our instant invention, reference will be made to the accompanying drawings wherein:

Figure 1 is a plan view of a vehicle chassis showing the physical arrangement of the components of the jack system of our instant invention;

Figure 2 is a top view of a frame-mounted jack of the system shown in Figure 1;

Figure 3 is a longitudinal cross sectional view of the jack of Figure 2 and is taken along section line 3—3 of Figure 2;

Figure 4 is a view, partly in section, of the jack of Figures 2 and 3 and is taken along section line 4—4 of Figure 2;

Figure 5 is a transverse sectional view of the jack of Figures 2, 3, and 4 and is taken along the section line 5—5 of Figure 4; and Figure 6 is a detail view of a retainer ring employed for retaining the jack of Figures 2, 3 and 4 in a fixed position.

Referring first to the plan view of Figure 1, a vehicle frame is generally designated by numeral 10 and it includes side rail members 12 and 14 and frame cross members 16, 18, 20, 22, and 24. A pair of traction wheels is generally designated by numerals 26 and 28, said wheels being carried by an axle shaft assembly 30 which may be suspended by the vehicle frame in a conventional manner. The vehicle wheels 26 and 28 may be powered by a vehicle engine shown at 32, said engine being drivably connected to the axle shaft assembly 30 through a propeller shaft 34 and a differential gear mechanism 36.

A pair of dirigible wheels 38 and 40 is mounted at the forward end of the vehicle frame 10 by a conventional forward suspension mechanism generally designated by numerals 42 and 44. Portions of the suspension mechanism 42 and 44 may be pivoted to the forward frame cross member 22, as shown at 46 and 48, to accommodate vertical displacement of the wheels 38 and 40. Steering arms for the wheels 38 and 40 are shown at 50 and 52 respectively, said arms being operatively connected to a manually operated pitman arm 54 by steering control link members 56 and 58 and by a tie rod member 60. The pitman arm 54 may be operated by the vehicle operator by means of a reduction gear mechanism 62, a steering shaft mechanism 64, and a steering wheel 66.

A hydraulic jack mechanism may be secured to either side of the forward portion of the frame 10 as shown at 68 and at 70. By preference, the jacks 68 and 70 are mounted on the outermost side of the frame side rails 12 and 14 respectively. Another pair of hydraulic jack mechanisms may be mounted at the rear of the frame 10 as shown at 72 and at 74. By preference, the jack mechanisms 74 and 72 are mounted on the innermost side of each of the frame side rails 12 and 14 respectively.

A fluid reservoir or tank is schematically shown in Figure 1 by numeral 76 and a manually operated pump is shown at 78, the former being connected to the latter through a fluid supply conduit 80. A one-way check valve 82 may be interposed in the conduit 80 to prevent a reversal in the flow of fluid from the pump 78 to the tank 76 and a one-way check valve 78' is provided at the outlet side of pump 78 to prevent a transfer of fluid from the pressurized jacks back into the pump. A distributor valve mechanism is schematically represented in Figure 1 by numeral 84. The valve mechanism 84 includes four fluid distributor passages 86, 88, 90, and 92 which communicate with the pump 78 through a conduit 94. The passages 86 through 92 also communicate with one side of each of a plurality of three-way valves which are respectively identified by numerals 96, 98, 100, and 102. The valve 102 is connected to the jack 72 by means of a high pressure conduit 110 and a low pressure conduit 112. Similarly, the jack 74 is connected to the valve 96 by means of a high pressure conduit 104 and by a low pressure conduit 106.

The forwardly mounted jack 68 may be connected to the valve 98 by high pressure conduit 116 and by a low pressure conduit 118 and the forwardly mounted jack 70 may be connected to the valve 100 by a high pressure conduit 120 and by a low pressure conduit 122. The function of the distributor valve mechanism 84 with its constituent valve components will be described subsequently in the statement of the operation of the invention.

For the purpose of more particularly describing the structure of the individual jacks, we have shown in Figures 2, 3 and 4 a detailed construction of the rearwardly mounted jack 74. It may be seen from Figures 2, 3 and 4 that the jack 74 is mounted in a substantially vertical position on the inside of the frame side rail 12, the latter being formed with a U channel shape in the conventional manner. A cylindrical sleeve element 128 is secured to the inside of the frame side rail 12 by a pair of angle brackets 130 and 132, one leg of the brackets 130 and 132 being welded or otherwise suitably secured to the frame side rail 12, as shown at 134 and 136 respectively. The other leg of the brackets 130 and 132 may be similarly welded to the sleeve 128 as indicated at 138 and 140 respectively. The sleeve 128 is positioned vertically with respect to the frame side rail 12 so that its uppermost edge 142 lies substantially in the plane of the upper surface 144 of the frame side rail 12.

A reinforcing backup plate 146 may be welded or otherwise secured to the upper surface 144 of the frame side rail 12 so that one edge thereof will overlap the edge of the side rail 12 as indicated at 148. The overlapping edge 148 is in abutting engagement with the upper surface 142 of the sleeve 128 so as to resist any upward displacement of the sleeve 128 with respect to the frame side rail 12.

Referring more particularly to Figures 3 and 4, the jack 74 comprises an outer casing 150 which defines a cylindrical working chamber 152. The casing 150 may be provided with axially spaced peripheral grooves 153 and 154. The casing 150 is adapted to be received within the sleeve 128 so that the grooves 153 and 154 are situated at either axial end of the sleeve 128 as indicated. A pair of retainer rings may be received within the grooves 153 and 154 after the casing 150 has been properly positioned within the sleeve 128, said rings being identified by numerals 156 and 158. It may be observed that the retainer rings 156 and 158 are substantially deeper in cross section than the associated retainer grooves 153 and 154 so that they overlap the inner peripheral edge of each of the axial ends of the sleeve 128. The rings 156 and 158 are therefore adapted to resist any relative movement of the casing 150 with respect to the sleeve 128.

Referring more particularly to Figures 5 and 6, a retainer ring 156 is shown in more particular detail. It may be observed that the retainer ring 156 is substantially semi-circular in shape, and by preference is formed with a rectangular cross section. One end of the semi-circular retainer ring 156 is provided with a spring loaded detent mechanism comprising a radially extending opening 160 having a reduced diameter portion 162. A detent ball 164 is adapted to be received in the opening 160 with a portion thereof extending through the reduced diameter portion 162. The ball 164 may be biased toward a radially inward position by spring 166 which in turn may be seated on a closure member 168 threadably received within the radially outward end of the opening 160. The casing 150 may be recessed, as shown at 170, to receive the detent ball 164. It is thus apparent that the detent mechanism is adapted to prevent the retainer ring 156 from becoming loosened from its assembled position.

It may be seen from Figures 3 and 4 that the jack 74 comprises a double acting piston member 177 which is carried by a piston rod 174, the latter being slidably received through an end closure member 176. The end of the casing 150 may be adapted to threadably receive the closure member 176 and may also be adapted to receive a suitable packing material 178 for preventing leakage of fluid around the piston rod 174. The piston rod 174 may carry at its extended ends a road engaging foot 180.

The above-described high pressure conduit 104 may be connected at the uppermost end of the working chamber 152 while the lower end of the working chamber 152 may be connected to the above-described low pressure conduit 106 as indicated. Suitable fittings 182 and 184 may be provided for effecting a fluid tight connection between the working chamber 152 and each of the conduits 104 and 106 respectively.

We contemplate that the above-described tank 76, the pumping mechanism 78, and the distributor valve mechanism 84 may be conveniently mounted in the vehicle trunk compartment when the system is used with a conventional automobile. However, it is apparent that these components may be mounted in any other location as desired.

During the operation of the instant invention, the pumping mechanism 78 may be manually operated so as to cause an increase in the pressure in any one or all of the high pressure conduits 104, 110, 116, or 120 as desired. For example, if it is desired to raise the left rear wheel of the vehicle for servicing, the valve 96 may be adjusted so as to provide a fluid connection between the passage 86 and the high pressure conduit 104. Each of the valves 98, 100, and 102 may be manually adjusted so as to interrupt communication between the branch passages 86, 88, and 92 with the fluid conduits leading to their associated jack mechanism. Upon operation of the pumping mechanism 78, high pressure fluid will therefore be delivered from the conduit 94 to the passage 86 and then through the valve 96 to the high pressure passage 104. Pressurized fluid will then pass into the working chamber above the double acting piston member 177 of the jack 74. The jack 74 will therefore move to an extended position thereby raising the left rear end of the vehicle frame. The check valve 78' in pump 78 functions to maintain the jack 74 in the extended position after the pumping operation ceases.

To lower the left rear end of the vehicle frame after the servicing operation is completed, the valve 96 may be rotated so as to interconnect the low pressure conduit 106 and the passage 86 and to interrupt communication between the high pressure conduit 104 and the passage 86. Therefore, upon subsequent operation of the pumping mechanism 78, fluid pressure will be delivered from fluid conduit 94, to the passage 86 and into the conduit 106. Fluid will therefore enter the working chamber below the double acting piston 177 to retract the latter to the uppermost position as indicated in Figure 3. The displaced fluid passing through the conduit 104 enters an accumulator chamber within the distributor valve mechanism 84. To raise any one of the other three wheels of the vehicle, it is merely necessary to rotate the associated valves 98, 100, or 102 so as to provide communication between the working chamber on the upper side of the associated jack mechanism with one of the distributor passages 88, 90, or 92. If desired, all of the jack mechanisms may be operated simultaneously by appropriately adjusting the associated distributor valves so that fluid pressure will be distributed equally to each of the jack mechanisms. The displaced fluid which accumulates in the accumulator associated with the distributor valve assembly 84 is eventually returned to the reservoir or tank 76 through a drain conduit 95.

The individual jacks may be installed or removed as desired merely by removing the retainer ring from each of the axially spaced retainer grooves and by disconnecting the fluid fittings at either axial end of the cylindrical working chamber. The jack housing may then be slidably removed or inserted into the associated cylindrical sleeve secured to the frame. If desired, the cylindrical sleeve may be secured to a frame cross member rather than the frame side rails as above described, although we prefer to use the frame side rails for this purpose because of the convenience in installing the jack mechanisms on these members.

Although we have particularly described the principal features of our instant invention, we contemplate that variations may be made within the scope of the invention as defined by the following claims.

What we claim and desire to secure by United States Letters Patent is:

1. Means for securing a jack to a vehicle frame comprising a pair of axially spaced peripheral grooves formed in said jack, a substantially vertically disposed sleeve member secured to said frame, said jack being slidably received within said sleeve member with one groove situated at either axial end of said sleeve member, a substantially semi-circular retainer member disposed in each of said grooves with the radially outward edge thereof overlapping the axial end of said sleeve member said retainer members being removable to permit relative movement between said jack and said sleeve member.

2. Means for securing a jack to a structural vehicle frame comprising a substantially cylindrical and vertically disposed sleeve adapted to surround said jack, bracket means for securing said sleeve to said frame, said bracket means including a back-up plate permanently secured to a portion of said frame on the upper side thereof, said plate overlapping a portion of one end of said sleeve, arcuate grooves formed in said jack adjacent either axial end of said sleeve, and substantially semi-circular retainers positioned in said grooves with the outer edge thereof overlapping said sleeve to prevent axial movement of said jack within said sleeve said retainers being removable to permit relative movement between said jack and said sleeve.

3. Means for securing a hydraulic jack to a structural vehicle frame comprising a substantially cylindrical and vertically disposed sleeve adapted to surround said jack, bracket means for securing said sleeve to said frame, said bracket means including a back-up plate permanently secured to a portion of said frame on the upper side thereof, said plate overlapping a portion of one end of said sleeve, arcuate grooves formed in said jack adjacent either axial end of said sleeve, substantially semi-circular retainers positioned in said grooves with the outer edge thereof overlapping said sleeve to prevent axial movement of said jack within said sleeve, a recess formed in a wall of each of said grooves, and a detent means carried by each of said retainers including a portion adapted to be received in said recess for resisting the removal of said retainer from its associated groove.

4. In a jack system for an automotive vehicle having a structural frame, means for securing individual hydraulic jacks to said frame comprising a substantially vertically disposed sleeve member adapted to surround said jack, bracket means for permanently securing said sleeve member to said frame including a back-up plate joined to a portion of said frame on the upper side thereof and overlapping the upper edge of said sleeve, arcuate grooves formed in said jack at spaced locations, said jack being received in said sleeve with one groove being adjacent each end of said sleeve, and a substantially semi-circular retainer disposed in each of said grooves, said retainer overlapping the end of said sleeve to prevent movement of said jack within said sleeve.

5. The combination as set forth in claim 4 wherein each of said grooves has a wall formed with a recess and wherein a detent element is carried by said retainer for reception within said recess, said detent element being spring biased into a recess engaging position.

References Cited in the file of this patent

UNITED STATES PATENTS

| | | |
|---|---|---|
| 1,873,116 | Dessaint | Aug. 23, 1932 |
| 2,206,623 | Barr | July 2, 1940 |
| 2,213,840 | Hoecker | Sept. 3, 1940 |
| 2,362,856 | Strunk et al. | Nov. 14, 1944 |
| 2,646,250 | Fuster | July 21, 1953 |